United States Patent
Marin et al.

(10) Patent No.: US 9,031,054 B2
(45) Date of Patent: May 12, 2015

(54) RESERVATION RESPONSE AND MULTI-USER TRANSMISSIONS

(75) Inventors: Janne Marin, Espoo (FI); Mika Kasslin, Espoo (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 392 days.

(21) Appl. No.: 12/803,932

(22) Filed: Jul. 9, 2010

(65) Prior Publication Data
US 2012/0008599 A1    Jan. 12, 2012

(51) Int. Cl.
H04B 7/212    (2006.01)
H04W 74/00    (2009.01)
H04W 84/12    (2009.01)

(52) U.S. Cl.
CPC .......... *H04W 74/006* (2013.01); *H04W 84/12* (2013.01)

(58) Field of Classification Search
CPC .............................. H04J 3/1694; H04W 74/04
USPC .................................. 370/322, 282, 443, 348
See application file for complete search history.

(56) References Cited

U.S. PATENT DOCUMENTS 7,616,655 B2 * 11/2009 Benveniste ................... 370/447
8,098,622 B2 *  1/2012 Yeo et al. ...................... 370/329
8,483,147 B2 *  7/2013 Lim et al. ..................... 370/329

OTHER PUBLICATIONS

"Multiple Access with Collision Avoidance", http://en.wikipedia.org/wiki/Multiple_Access_with_Collision_Avoidance (1 page).
"A New Channel Access Method for Packet Radio", Phil Karn (5 pages).
IEEE Standard for Information Technology—Telecommunications and Information Exchange Between Sytems—Local and Metropolitan Area Networks-Specific Requirements, Part 11: Wireless LAN Medium Access Control (MAC) and Physical Layer (PHY) Specifications, Amendment 5: Enhancements for Higher Throughput, IEEE Std 802.11n 2009 ( 502 pages) (Oct. 29, 2009).

* cited by examiner

Primary Examiner — Chandrahas Patel
(74) Attorney, Agent, or Firm — Harrington & Smith (57) ABSTRACT

In one embodiment, in absence of transmitting from an apparatus a reservation request frame, the apparatus receives a reservation response frame on an assigned channel. The reservation response frame indicates a duration of a frame transmission. In response to receiving the reservation response frame, the apparatus transmits a frame on the assigned channel during the frame transmission. In another embodiment, in response to receiving a reservation request frame on a first channel at an apparatus, the apparatus transmits a reservation response frame on the first channel and on at least one second channel. The reservation request frame indicates a duration of a frame transmission. The reservation response frame indicates the duration of the frame transmission. After transmitting the reservation response frame, this apparatus receives during the frame transmission a first frame on the primary channel and a second frame on the at least one secondary channel.

8 Claims, 6 Drawing Sheets

RESERVATION RESPONSE AND MULTI-USER TRANSMISSIONS

TECHNICAL FIELD

The exemplary and non-limiting embodiments of this invention relate generally to wireless communication systems, methods, devices and computer programs and, more specifically, relate to communications in networks which use a collision avoidance procedure for channel access.

BACKGROUND

This section is intended to provide a background or context to the description, and may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AP access point
ACK acknowledge
CTS clear to send
IEEE Institute of Electrical and Electronics Engineers
MAC medium access control
NAV network allocation vector
PHY physical layer
PLCP physical layer convergence protocol
PPDU PLCP payload data unit
RTS request to send
STA station (not acting as an AP unless otherwise stipulated)
TXOP transmission opportunity
UL uplink (non-AP STA towards AP)
WLAN wireless local area network In WLAN systems there are potentially multiple stations which may each transmit frames to the access point at any given time. To avoid collisions a signaling protocol has the STA making an announcement before it sends the frame which informs other nodes to keep silent. Specifically, the STA sends a RTS with the length of the data frame or management it wishes to send, and the AP responds with a CTS with the length of the frame that the AP is about to receive. In this manner it is the STA with frame to send which controls transmissions on the channel.

Other nodes in the area of that same AP remain silent upon hearing the RTS so as not to block the CTS that follows, and remain silent for the period of time stipulated in the CTS. Conventionally, this signaling protocol is the WLAN channel access mechanism set forth at IEEE 802.11, and its purpose is to provide protection against interference by 'hidden terminals' which are unknown to the AP and STA. This RTS-CTS signaling establishes a NAV protection during which only the STA as holder of the TXOP may decide on the format and type of the traffic to be transmitted.

Figure 1:
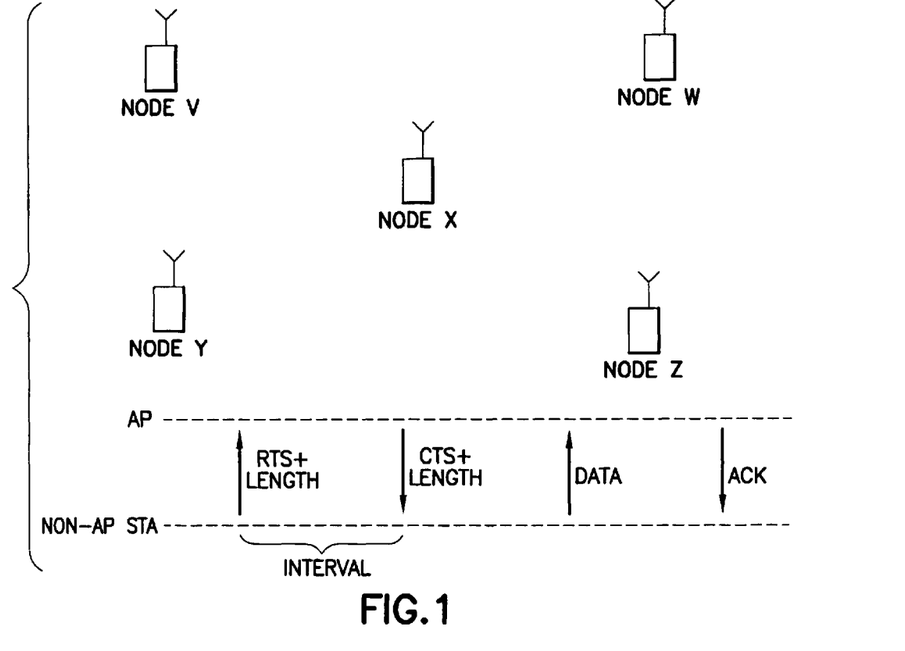
FIG. 1 is a schematic diagram showing exemplary an arrangement of nodes communicating in a WLAN, and a message exchange for channel access.

This general approach is shown at FIG. 1, in which there are five nodes V-Z in the network. Assume Node X is the AP and node W is the non-AP STA that has data or frames to send. The STA/node W sends its RTS with an indication of the length of data or frame or message it has, and awaits a time interval. Within a preset time interval the AP/node X sends a CTS with the indication of length derived from the length indicator value in the RTS. The STA/node W then sends its frame which is acknowledged ACK by the AP/node X. At least node Y is too far to hear transmissions from the STA/node W and so it is a hidden node, but it knows the period of time during which it must refrain from transmitting from the CTS+length message it hears from the AP/node X. There are also specific procedures for imposing a time backoff if there is a collision of RTSs, and for re-transmitting the RTS if the CTS is not received within the interval.

Research is now proceeding toward a new generation of WLAN being standardized as IEEE 802.11ac with amendments to PHY and MAC standards which may increase throughput to 3 Gbit/second in the 5 GHz spectrum and which enables multiple users in a MU-MIMO configuration using up to 80 or 160 MHz bands.

IEEE 802.11ac is to remain compatible with legacy 802.11n user devices. To extend the legacy RTS/CTS scheme directly would result in transmission capacity being wasted in the 802.11ac system. One reason why this would be wasteful is because the legacy devices transmitting in only 20 or 40 MHz bands would, by the RTS/CTS scheme, keep other devices from using the entire 80 or 160 MHz total spectrum in use in the 802.11ac system.

SUMMARY

The foregoing and other problems are overcome, and other advantages are realized, by the use of the exemplary embodiments of this invention.

In a first aspect thereof the exemplary embodiments of this invention provide a method, comprising: in absence of transmitting from an apparatus a reservation request frame, receiving at the apparatus a reservation response frame on an assigned channel, the reservation response frame indicating a duration of a frame transmission; and in response to receiving the reservation response frame, transmitting from the apparatus a frame on the assigned channel during the frame transmission.

In a second aspect thereof the exemplary embodiments of this invention provide a non-transitory memory storing a program of computer readable instructions, that when executed by at least one processor result in actions comprising: in absence of transmitting from an apparatus a reservation request frame, receiving at the apparatus a reservation response frame on an assigned channel, the reservation response frame indicating a duration of a frame transmission; and in response to receiving the reservation response frame, transmitting from the apparatus a frame on the assigned channel during the frame transmission.

In a third aspect thereof the exemplary embodiments of this invention provide an apparatus, comprising at least one processor and at least one memory storing computer program code. The at least one memory and the computer program code are configured, with the at least one processor, at least to: receive a reservation response frame on an assigned channel in absence of transmitting a reservation request frame, the reservation response frame indicating a duration of a frame transmission; and in response to receiving the reservation response frame, transmit a frame on the assigned channel during the frame transmission.

In a fourth aspect thereof the exemplary embodiments of this invention provide a method, comprising: receiving at an apparatus a reservation request frame on a first channel, the reservation request frame indicating a duration of a frame transmission; in response to receiving the reservation request frame, transmitting from the apparatus a reservation response frame on the first channel and on at least one second channel, the reservation response frame indicating the duration of the frame transmission; and after transmitting the reservation response frame, receiving at the apparatus during the frame transmission a first frame on the first channel and a second frame on the at least one second channel.

In a fifth aspect thereof the exemplary embodiments of this invention provide a non-transitory memory storing a program of computer readable instructions, that when executed by at least one processor result in actions comprising: in response to receiving a reservation request frame on a first channel, the reservation request frame indicating a duration of a frame transmission, transmitting a reservation response frame on the first channel and on at least one second channel, the reservation response frame indicating the duration of the frame transmission; and after transmitting the reservation response frame, receiving during the frame transmission a first frame on the primary channel and a second frame on the at least one secondary channel.

In a sixth aspect thereof the exemplary embodiments of this invention provide an apparatus, comprising at least one processor and at least one memory storing computer program code. The at least one memory and the computer program code are configured, with the at least one processor, at least to: receive a reservation request frame on a first channel, the reservation request frame indicating a duration of a frame transmission; in response to receiving the reservation request frame, transmit a reservation response frame on the first channel and on at least one second channel, the reservation response frame indicating the duration of the frame transmission; and after transmitting the reservation response frame, receive during the frame transmission, a first frame on the first channel and a second frame on the at least one second channel.

In a seventh aspect thereof the exemplary embodiments of this invention provide an apparatus, comprising: means for receiving a reservation response frame on an assigned channel in absence of transmitting a reservation request frame, the reservation response frame indicating a duration of a frame transmission; and in response to receiving the reservation response frame, means for transmitting a frame on the assigned channel during the frame transmission.

In an eighth aspect thereof the exemplary embodiments of this invention provide an apparatus, comprising: means for receiving a reservation request frame on a first channel, the reservation request frame indicating a duration of a frame transmission; means for transmitting a reservation response frame on the first channel and on at least one second channel in response to receiving the reservation request frame only on the first channel, the reservation response frame indicating the duration of the frame transmission; and means for receiving during the frame transmission and after transmitting the reservation response frame a first frame on the first channel and a second frame on the at least one second channel.

DETAILED DESCRIPTION

While the exemplary embodiments detailed below are in the context of a WLAN system as generally detailed by IEEE 802.11 series specifications, these teachings are not limited only to such systems but may be extended to any system which uses a reservation/response signaling arrangement in a contention based access environment. Therefore terms such as AP, STA, RTS, CTS and the like which are commonly associated with WLAN systems are used for clarity of description and are not limiting to the broader teachings herein. For example, the non-AP STAs which send the RTSs are referred to more generically as first, second, third and fourth devices or apparatuses, and the AP which sends the CTS may be considered more generically as the access node or apparatus. The first through fourth devices may or may not be user devices.

Figure 2:
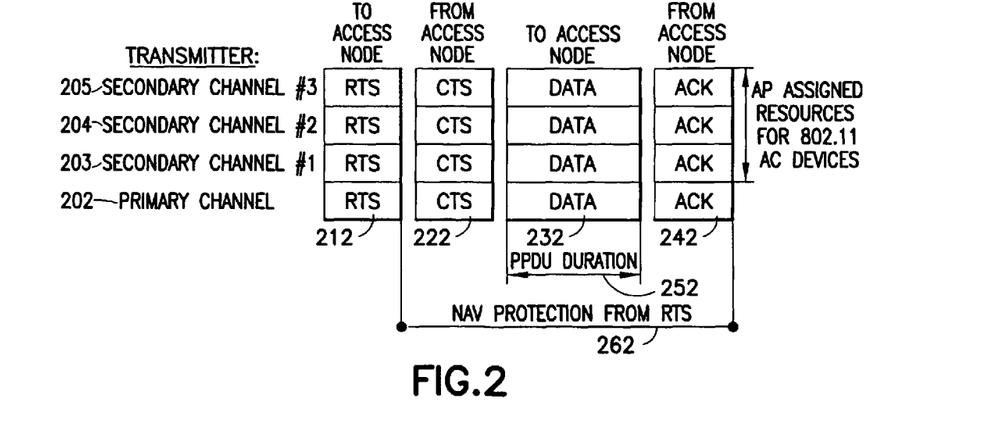
FIG. 2 is a signaling diagram illustrating one possible extension of channel access signaling for IEEE 802.11ac networks.

FIG. 2 is one possible extension of channel access signaling for IEEE 802.11ac networks. There are four channels in the 80 or 160 MHz bandwidth, shown at FIG. 2 as four distinct rows. The lowermost row is considered the primary channel 202 which is the only channel on which legacy WLAN devices are assigned, and the other rows are secondary channels 203-205 on which any non-legacy WLAN device may be assigned. In a non-limiting embodiment particular to current WLAN specifications the legacy user devices are restricted to only the primary channel 202 and the non-legacy WLAN devices may be assigned to any channel 202-205. At FIGS. 2-4, each column indicates whether the transmission is sent to or from the access device to the first through fourth devices, each of which is assigned one and only one respective channel, with the first device being assigned the primary channel. In embodiments any of those first through fourth devices may be assigned more than one channel.

For each opportunity to transmit frame 232 on a respective channel 202-205, the first through fourth device must send an RTS 212 on its assigned channel to the access node and also receive a CTS on that same respective channel 202-205 from the access device. The length of each of the messages sent is shown as the PPDU duration 252. On the primary channel 202 it is shown that for the time beginning from the RTS 212 there is network allocation vector NAV protection 262 from collisions by other devices on the respective channel 202. There is a corresponding NAV protection for the devices' frames on other channels 203-205. In case the same device sends an RTS on two or more different channels 203-205, the various messages to and from that device on the different channels may be aligned in time. The access node sends an ACK 242 on each respective channel 202-205 on which it properly received the uplink message 232.

But the various devices at FIG. 2 are not synchronized with one another prior to sending their contention-based channel access requests 212. The access node is assumed to have only one wideband receiver and so it must use MU-MIMO principles to decode the multiple RTSs 212 it receives, which it cannot do if they are unsynchronized. Such synchronization must be continued through data transmission via frames 222, 232 and 242 for similar reasons, but in IEEE 802.11 there is no mechanism to synchronize beginning with the RTSs 212 and so this direct extension of legacy WLAN contention-based access procedures is not operable.

Figure 3:
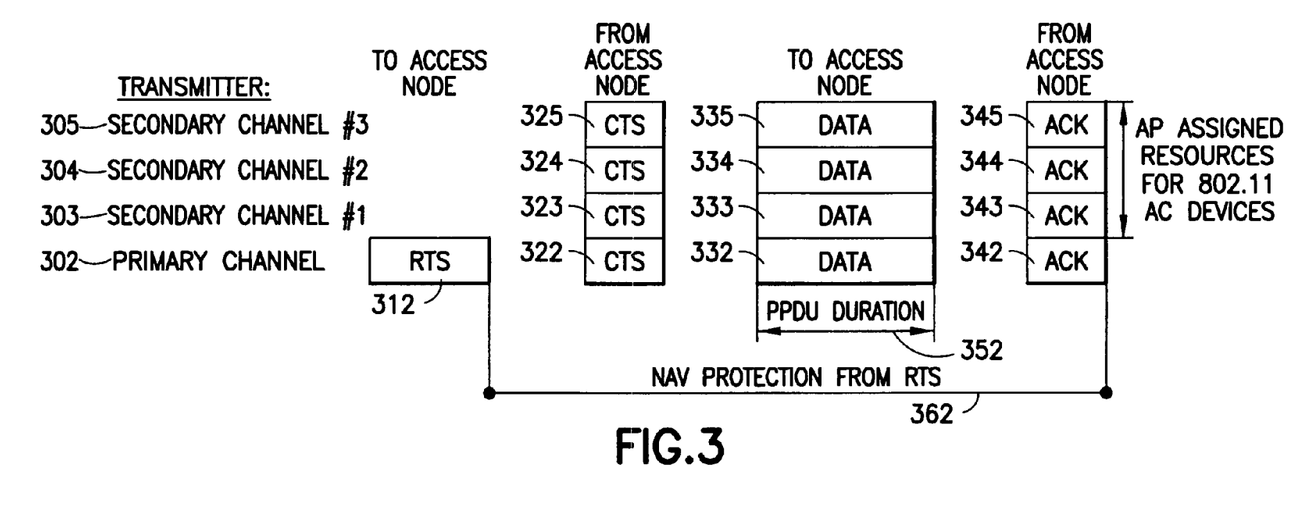
FIG. 3 is a signaling diagram for channel access according to one exemplary embodiment of the invention.

According to an embodiment there is a RTS/CTS protocol as shown by non-limiting example at FIG. 3. Like FIG. 2 there are four channels 302-305 of which one is primary 302, and it is assumed that there is a different device on each channel 302-305. There is a first device on the primary channel 302 which sends a RTS 312 on that primary channel. In this specific example, the signaling that the first device or STA sees on the primary channel 302 is identical to that it sees at FIG. 2; the access node or AP sends to the first device on the primary channel 302 a CTS 322, the first device sends on that same primary channel 302 its data or frame 332, and the access node sends to the first device on the primary channel 302 an ACK 242 for that data frame 232 which alternatively may be a management frame. The first device on the primary channel 302 may be a legacy IEEE 802.11 device or an IEEE 802.11ac device.

But at FIG. 3, in response to receiving the RTS 312 on the primary channel 302 the access node also sends a CTS on at least one of the secondary channels 302-305. In an embodiment the access node sends a CTS 323-325 on each of the secondary channels 303-305 which the access node senses to be free from interference and determines to be unallocated. In an exemplary but non-limiting embodiment the sensing means a physical sensing; the access node measures received signal level on each of the secondary channels 303-305 and for each such channel 303-305 for which the received signal strength RSSI is less than a predetermined threshold the access node sends a CTS message 323-325 on that respective channel 303-305. In other embodiments the access node may use some other metric to determine whether the sensed secondary channel 303-305 is clear before sending its CTS message 323-325. In an exemplary but non-limiting embodiment the channel is determined to be unallocated if the virtual carrier sensing (e.g. NAV protection) indicates the channel to be available. While in the above example the access node sends a CTS 322-325 on each secondary channel 303-305, more broadly it may send a CTS on at least one of those secondary channels 323-325, particularly only on those secondary channels 303-305 which the access node considers free of interference.

In an exemplary embodiment the CTS messages 323-325 sent on one or more of the secondary channels 303-305 that are determined to be free of interference each include an indication a frame duration 352. In the RTS 312 which the access node received on the primary channel 302, there is some indication by the first device on the primary channel 302 of the size of the frame which that first device has to send. The duration 352 indicated in the CTS 322-325 that the access node sends on the various interference-free channels 302-305 is based on the volume or length or duration indication that is included in the RTS message 312. The duration indicated in the CTS message 322 need not be the same as that indicated in the RTS message 312. The access node sends an indication of the same duration 352 in each CTS message 322-325 on the various channels 302-305. In this manner and unlike FIG. 2, the NAV protection 362 runs for the same duration 352 across the primary channel 302 and across every secondary channel 303-305 on which the access node sent a CTS 323-325.

Note that in FIG. 3, each of the second through fourth device which receives the CTS 323-325 on a secondary channel 303-305 receives it in the absence of that same second through fourth device sending any RTS on the secondary channel 303-305. This is contrary to FIG. 2 in which each individual CTS message was in reply to a RTS on that same channel 202-205. At FIG. 3, note that any of the second through fourth device may have previously sent a RTS on its secondary channel 303-305 (in frames prior to those shown at FIG. 3) but the CTS 323-325 it now receives on its assigned secondary channel 303-305 does not correspond to any of those previously-sent RTSs.

FIG. 3 continues by assuming that the second through fourth devices which received their unsolicited CTSs 323-325 on their assigned secondary channels 303-305 have data or management frames 333-335 to send. Note that the duration 352 limits the extent of how long these second through fourth devices can send in response to that unsolicited CTS message 323-325. This also is contrary to FIG. 2 in which each frame 232 sent was according to the duration reported by the second through fourth device in its RTS 212 sent on that same channel 202-205. That is, the respective PPDU durations 252 in FIG. 2 match the respective duration indications sent with the RTS 212 on that same channel 202-205. In that respect the data (or management) frame duration 252 per channel 202-205 are independent of one another at FIG. 2. To the contrary, the data (or management) frame durations 332-325 at FIG. 3 are identical since they are all based on one RTS 312. Any of the first through fourth device may send less than that allowed by the duration 352 indicated in the CTS 322-325 but the NAV protection is only for the indicated duration. Further at FIG. 3 the access node sends ACKs 342-345 on the respective channels 302-305 for each of the data (or management) frames 332-335 it receives. These ACKs are transmitted at the same time.

Figure 4:
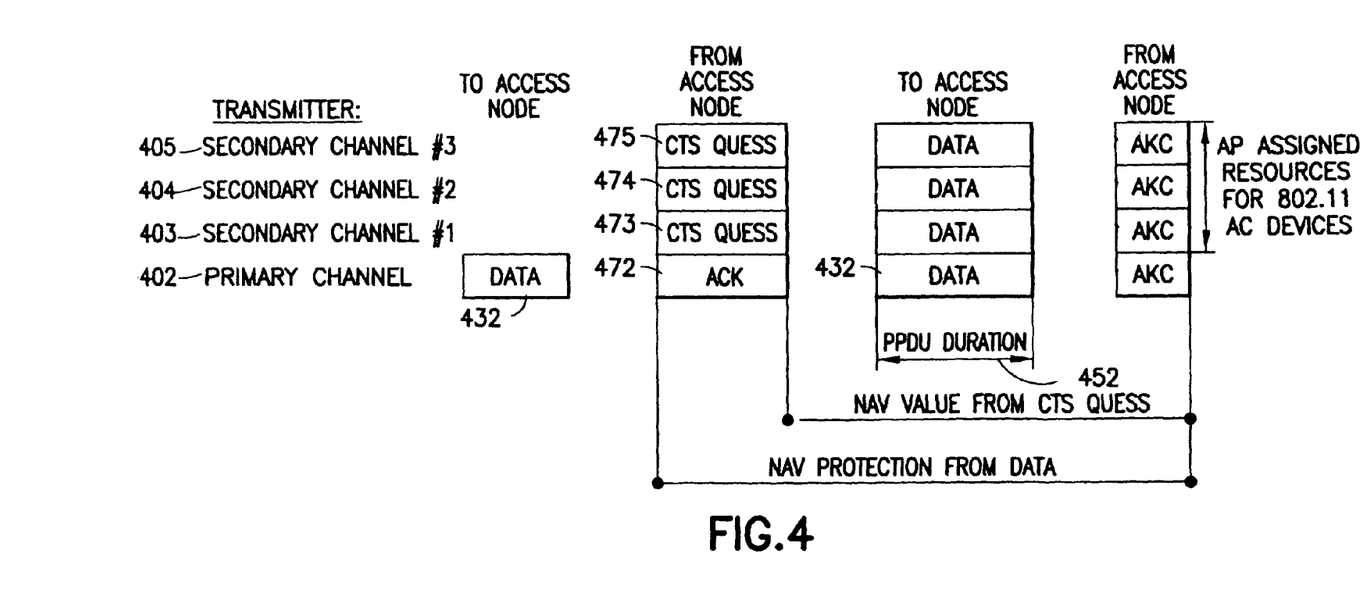
FIG. 4 is a is a signaling diagram for channel access according to another exemplary embodiment of the invention

FIG. 4 illustrates signaling according to an exemplary embodiment of the invention following a first frame being sent, such as the frame 322 shown at FIG. 3. In this example, assume that the RTS sent on the primary channel 302 by the first device had an indication for a volume greater than could fit in a single frame. In this case the first device on the primary channel 402 will send its data or management information over more than one frame and so the indication of PPDU duration sent by the access node in the CTS indicated less than all of the primary channel first device's data or management information. In this case the first device will still hold the transmission opportunity TXOP after sending its first data (or management) frame 332 and receiving the ACK 342 for it. At FIG. 4 that first data or management frame is shown at 432 and the ACK following it is 472.

Assume further that the second through fourth devices which are assigned the secondary channels 403-405 did not send anything at the time that the first user device on the primary channel 402 sent its first data or management frame 432. According to an exemplary embodiment of the invention the access node sends to the first device on the primary channel 402 an ACK 472 for the frame 432, and simultaneously sends a CTSguess 473-475 to at least one other (second through fourth) device on a respective at least one other secondary channel 403-405, in the absence of receiving any corresponding data or management frame from the second through fourth devices and in the absence of receiving any RTS in a corresponding frame from the second through fourth devices.

The supplementary CTSguess 473-475 which the access node sends on the secondary channel(s) 403-405 simultaneous with the ACK 472 it sends on the primary channel 402 enables the second through fourth devices on the secondary channel 403-405 to send further data or management frames.

In an exemplary embodiment of the invention the PPDU duration 452 at FIG. 4 is calculated from a duration value indicated in the most recent preceding frame 432 on the primary channel 402. In an exemplary embodiment the access node indicates the duration 452 for the next data or management frame 432 in the immediately preceding ACK message 472 on the primary channel 403. As with FIG. 3, the duration 452 on the secondary channels 403-405 is the same as that on the primary channel 402 for a given frame, which the access node indicates to any hidden nodes via the respective CTS-guess 473-475 on the respective secondary channels 403-405. Note that the durations 352, 452 for different frames 332, 432 at different times may differ across the same TXOP.

While the description of FIGS. 2-4 above assumed a different device on each different channel, for the case in which a single device is assigned multiple channels the same signaling remains, but that device is able to send its frame on any of those multiple assigned channels on which it received a CTS, regardless of whether it sent a RTS only on the primary channel or whether it sent no RTSs at all which would be the case if the device were assigned only non-primary channels.

In an exemplary embodiment of the invention, each column of FIGS. 2-4 represents a transmission frame. Therefore an exemplary embodiment of the invention may be described from the perspective of the access node as, upon receiving an RTS or data or management frame on a primary channel, sending a CTS frame in secondary channels to devices other than the specific device that transmitted the RTS frame. Similarly, an exemplary embodiment of the invention may be described from the perspective of a device assigned to a secondary channel as, in the absence of sending any of a RTS or data or management information on an assigned (secondary) channel in a first frame, receiving a CTS frame in the assigned (secondary) channel and sending a data or a management frame in the secondary channel following the CTS.

The term primary versus secondary channel are for clarity of description in the exemplary context of legacy IEEE 802.11 devices in a same network with IEEE 802.11ac devices, but as noted above the WLAN environment of the examples is not limiting to these teachings. Similarly, the term first frame is used simply to distinguish from other described frames.

According to the exemplary embodiments of the invention one technical effect is more efficient use of system resources. The above examples improve efficiency for the UL transmissions, but embodiments of the invention may be employed to improve efficiency for downlink transmissions or for transmissions in general where the distinction between uplink and downlink is less clear, such as for example mesh networks and/or ad hoc networks. The RTS-CTS signaling protocol is the predominant protection against the hidden terminal problem and it is widely used in WLAN, so implementation of these teachings will not require extensive modifications to radio infrastructure, and it may improve data throughput from at least the legacy IEEE 802.11 devices/STAs.

Figure 5:
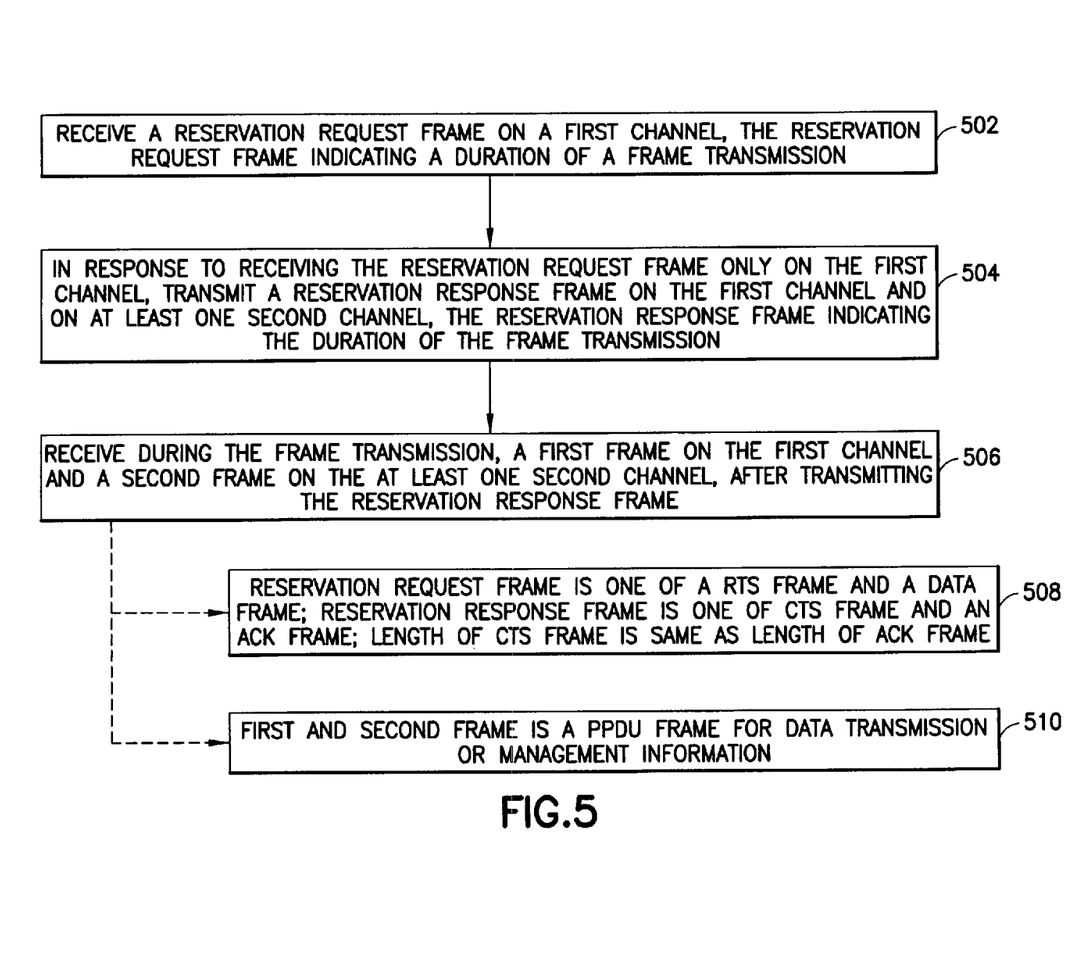
FIG. 5 is a logic flow diagram that illustrates a method or actions taken by an apparatus in the position of the described AP according to an exemplary embodiment of the invention.

FIG. 5 is a logic flow diagram that illustrates, in accordance with an exemplary embodiment of this invention from the perspective of the access node (such as by non-limiting example an AP in a WLAN system), the operation of a method, and a result of execution of computer program instructions embodied on a computer readable memory, and actions taken at an apparatus such as the access node or one or more components thereof such as at least one processor and at least one memory storing a computer program. As shown at FIG. 5, at block 502 there is a reservation request frame received on a first channel. This reservation request frame indicates a duration of a frame transmission, such as for example duration of a data frame or of a management frame. At block 504 there is transmitted a reservation response frame on the first channel and on at least one second channel, and it is transmitted on those multiple first and at least second channels in response to receiving the reservation request frame at block 502. That is, transmitting the reservation response frame on at least the one second channel does not require receipt of a reservation request frame on that second channel. This reservation response frame indicates the duration of the frame transmission. And at block 506 there is received during the frame transmission, a first frame on the first channel and a second frame on the at least one second channel. This receiving may occur simultaneously or after transmitting the reservation response frame.

Further at FIG. 5 are shown various optional elements. At block 508 is seen that the reservation request frame may be at least one of a request to send RTS frame and a data frame and a management frame; and/or the reservation response frame may be at least one of a clear to send CTS frame and an acknowledgement ACK frame; and/or that the length of the CTS frame may be equal to the length of the ACK frame. At block 510 is a more particular embodiment in which the first and second frame which the access node receives is a physical layer convergence protocol payload data unit PPDU frame for data or management frame transmission.

Not stated explicitly within FIG. 5 but detailed above is that for the exemplary WLAN AP embodiment, the reservation request frame as well as the first frame are received from a first user device (which may be for example a legacy IEEE 802.11 WLAN user device/STA) on the first channel which is a primary channel, and the second frame is received from a second user device (which may for example be an enhanced IEEE 802.11ac WLAN user device/STA) on the at least one second channel, which is/are non-primary or secondary channel(s). Further, the duration of the frame transmission at block 504 refers to simultaneous data or management frame transmission on the first/primary channel and on the at least one second/secondary channel. As with the specific examples above, in a particular embodiment the reservation response frame that is transmitted on the at least one second channel at block 504 is directed toward such a second user device different from the first user device from which the reservation request frame of block 502 was received.

Figure 6:
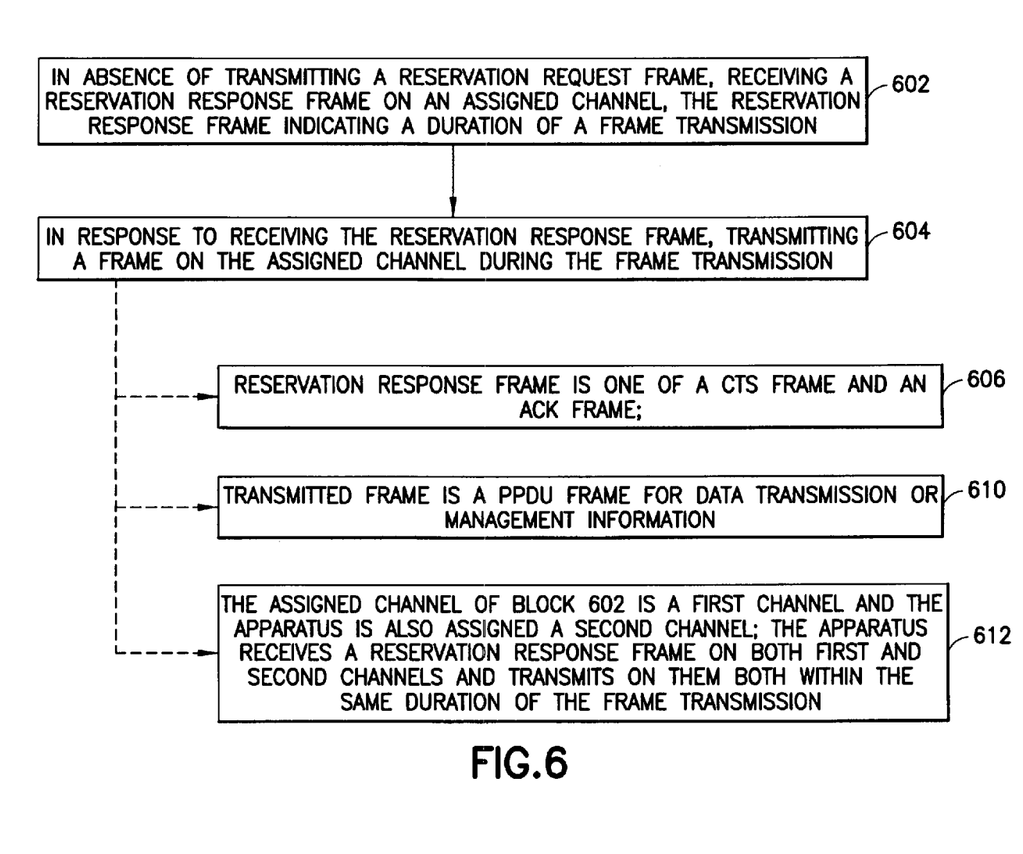
FIG. 6 is a logic flow diagram that illustrates a method or actions taken by an apparatus in the position of the described non-AP STA according to an exemplary embodiment of the invention.

FIG. 6 is a logic flow diagram that illustrates, in accordance with an exemplary embodiment of this invention from the perspective of the second device which is operating on at least one of the secondary channels, the operation of a method, and a result of execution of computer program instructions embodied on a computer readable memory, and actions taken at an apparatus such as the above noted STA or one or more components thereof such as at least one processor and at least one memory storing a computer program. As shown at FIG. 6, at block 602 in the absence of transmitting from an apparatus a reservation request frame there is received at the apparatus a reservation response frame on an assigned channel, and this unsolicited reservation response frame indicates a duration of a frame transmission. And at block 604 there is transmitted by the apparatus during the frame transmission a frame on the assigned channel, in response to receiving the reservation response frame.

Further at FIG. 6 are shown various optional elements. At block 606 is seen that the reservation response frame may be one of a clear to send CTS frame and an acknowledgement ACK frame. At block 610 the transmitted frame is a physical layer convergence protocol payload data unit PPDU frame for data or management frame transmission. At bock 612 the apparatus is assigned both a first and a second channel. In this case the assigned channel of block 602 is the first channel and the apparatus receives a reservation response frame on both the first and the second channels, and thereafter transmits its data or management frame on them both within the same duration of the frame transmission shown at block 602 since the duration in both of the reservation response frames it receives is identical.

Figure 7:
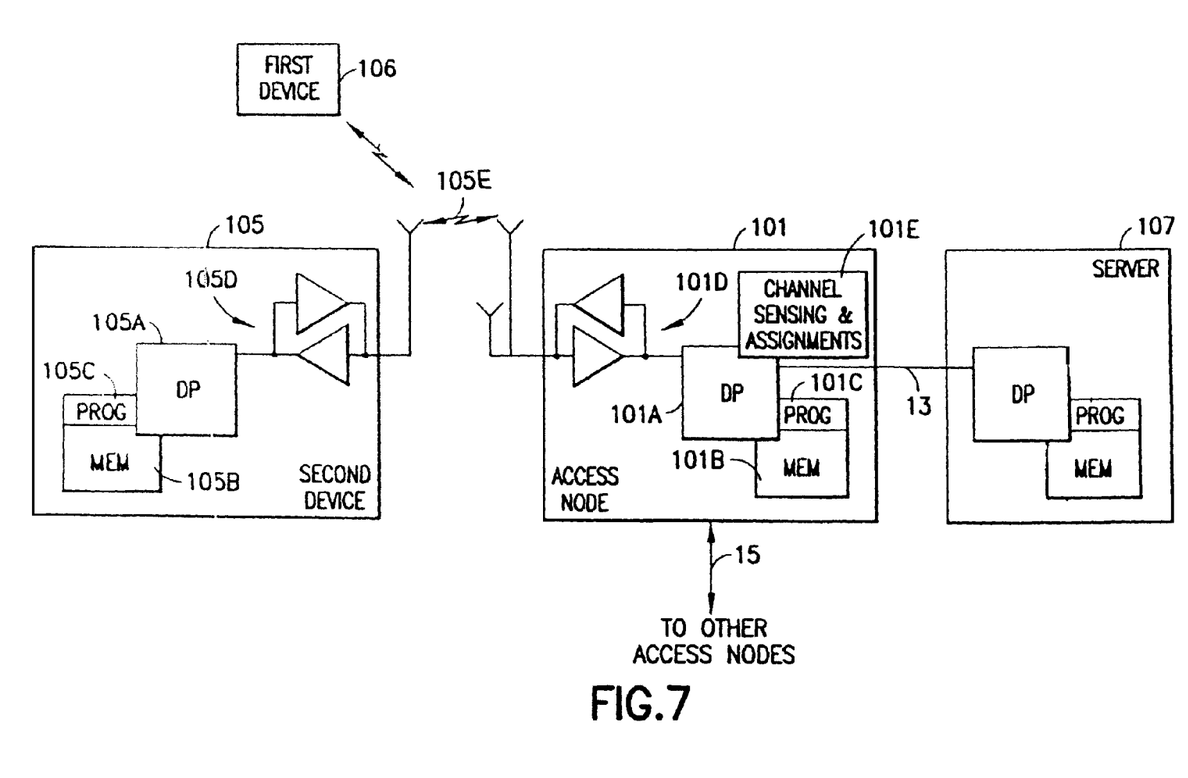
FIG. 7 shows a simplified block diagram of various electronic devices that are suitable for use in practicing the exemplary embodiments of this invention.

Apparatus according to exemplary embodiments of the invention, including apparatus for carrying out the process flow diagrams of FIGS. 5-6, now are detailed at FIG. 7 which is a simplified block diagram of various electronic devices and apparatus that are suitable for use in practicing the exemplary embodiments of this invention. In FIG. 5 communications over a wireless link 105E are between an apparatus, such as a user device which may be referred to as a UE and which is in the position of the second device/STA 105, and an access device/AP which is in the position of the access node 101 (which in a specific WLAN embodiment may be a STA acting in capacity of an AP or a non-STA AP). The access node 101 may have connectivity with a further network such as a data communications network (e.g., the internet) via a server 107. The second device 105 of FIG. 5 may be an enhanced 802.11 ac compliant WLAN STA noted above, and there is another wireless link 105d between the access node 101 and a first device 106 which may be constructed similar as the second device 105 but which may be a legacy 802.11n compliant WLAN STA.

The second device 105 may comprise at least one controller, such as a computer or a data processor (DP) 105A, at least one computer-readable memory medium embodied as a memory (MEM) 105B that stores a program of computer instructions (PROG) 105C, and a suitable radio frequency (RF) transceiver 105D for bidirectional wireless communications with the access node 101 via one or more antennas. The access node 101 may also comprise at least one controller, such as a computer or a data processor (DP) 101A, at least one computer-readable memory medium embodied as a memory (MEM) 101B that stores a program of computer instructions (PROG) 101C, and a suitable RF transceiver 101D for communication with the access requesting devices 105, 106 via one or more antennas. The access device 101 may be coupled via a data/control path 13 to the server 107. The access responding device 101 may also be coupled to another access device via data/control path 15.

At least one of the PROGs 105C and 101C is assumed to include program instructions that, when executed by the associated DP, enable the device/apparatus to operate in accordance with the exemplary embodiments of this invention, as is detailed above. That is, the exemplary embodiments of this invention may be implemented at least in part by computer software executable by the DP 105A of the access requesting device 105 and/or by the DP 101A of the access responding device 101, or by hardware, or by a combination of software and hardware (and firmware).

For the purposes of describing the exemplary embodiments of this invention the access device 101 may be assumed to also include a channel assignment listing 101E by which it tracks which user devices are temporarily assigned to which secondary channels 303-305, 403-405 and knows to whom to send a CTS message on a secondary channel, as detailed above and at FIGS. 5-6. Element 101E is also a channel sensor by which the access node 101 measures channel interference and determines which channels are free of interference, as detailed above.

In general, the various embodiments of the second device 105 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The access node 101 may also be embodied as any one of these since in a particular implementation for WLAN at least, a STA can function as an AP in certain instances. In other embodiments the second device need not be mobile.

The computer readable MEMs 105B and 101B may be of any type suitable to the local technical environment and may be implemented using any suitable data storage technology, such as semiconductor based memory devices, flash memory, magnetic memory devices and systems, optical memory devices and systems, fixed memory and removable memory. The DPs 105A and 101A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 5-6 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

What is claimed is:

1. A method, comprising:

receiving at an apparatus a reservation request frame on a first channel configured for carrying both data and control information, the reservation request frame indicating a duration of a frame transmission;

in response to receiving the reservation request frame, transmitting a reservation response frame from the apparatus on multiple channels, including on the first channel and on at least one second channel configured for carrying both data and control information, the reservation response frame indicating the duration of the frame transmission; and after transmitting the reservation response frame, receiving at the apparatus during the frame transmission a first frame on the first channel and a second frame on the at least one second channel.

2. The method according to claim 1, wherein:

the reservation request frame is at least one of a request to send frame and a data frame and a management frame;

the reservation response frame is one of clear to send frame and an acknowledgement frame; and the frame transmission is a physical layer convergence protocol payload data unit frame for data transmission.

3. The method according to claim 1, wherein the apparatus comprises an access point of a wireless local area network which transmits the reservation response frame on the first and the at least one second channels only after said channels are determined to be free of interference; and in which:

the reservation request frame and the first frame are received from a first user device which is assigned the first channel which is a primary channel; and the second frame is received from a second user device that is different than the first user device and which is assigned the at least one second channel which is not the primary channel.

4. A non-transitory memory storing a program of computer readable instructions that when executed by at least one processor result in actions comprising:

in response to receiving a reservation request frame on a first channel configured for carrying both data and control information, the reservation request frame indicating a duration of a frame transmission, transmitting a reservation response frame on multiple channels, including on the first channel and on at least one second channel configured for carrying both data and control information, the reservation response frame indicating the duration of the frame transmission; and after transmitting the reservation response frame, receiving during the frame transmission a first frame on the primary channel and a second frame on the at least one secondary channel.

5. The non-transitory memory according to claim 4, wherein:

the reservation request frame is at least one of a request to send frame and a data frame and a management frame;

the reservation response frame is one of clear to send frame and an acknowledgement frame; and the frame transmission is a physical layer convergence protocol payload data unit frame for data transmission.

6. An apparatus comprising:

at least one processor; and at least one memory storing computer program code;

the at least one memory and the computer program code configured, with the at least one processor, at least to:

receive a reservation request frame on a first channel configured for carrying both data and control information, the reservation request frame indicating a duration of a frame transmission;

in response to receiving the reservation request frame, transmit a reservation response frame on multiple channels, including on the first channel and on at least one second channel configured for carrying both data and control information, the reservation response frame indicating the duration of the frame transmission; and after transmitting the reservation response frame, receive during the frame transmission, a first frame on the first channel and a second frame on the at least one second channel.

7. The apparatus according to claim 6, wherein the reservation request frame is at least one of a request to send frame and a data frame and a management frame; and the reservation response frame is one of clear to send frame and an acknowledgement frame.

8. The apparatus according to claim 6, wherein the apparatus comprises an access point of a wireless local area network which is configured to transmit the reservation response frame on the first and the at least one second channels only after said channels are determined to be free of interference; and in which:

the reservation request frame and the first frame are received from a first user device that is a station which is assigned the first channel which is a primary channel; and the second frame is received from a second user device that is a station different than the first user device and which is assigned the at least one second channel which is not the primary channel.

* * * * *